A. B. BUNKER.
MARINE COMPASS.
APPLICATION FILED SEPT. 7, 1918.

1,332,027.

Patented Feb. 24, 1920.
2 SHEETS—SHEET 1.

Witness
Chas. S. Hoyt

Inventor
Alva B. Bunker
By
James L. Norris
Attorney

A. B. BUNKER.
MARINE COMPASS.
APPLICATION FILED SEPT. 7, 1918.

1,332,027.

Patented Feb. 24, 1920.
2 SHEETS—SHEET 2.

Witness
C. D. Hasler
Chas. S. Hoyer

Inventor
Alva B. Bunker
By James L. Norris
Attorney

UNITED STATES PATENT OFFICE.

ALVA B. BUNKER, OF SOUTH GOULDSBORO, MAINE.

MARINE COMPASS.

1,332,027.   Specification of Letters Patent.   Patented Feb. 24, 1920.

Application filed September 7, 1918. Serial No. 253,064.

*To all whom it may concern:*

Be it known that I, ALVA B. BUNKER, a citizen of the United States, residing at South Gouldsboro, in the county of Hancock and State of Maine, have invented new and useful Improvements in Marine Compasses, of which the following is a specification.

This invention relates to marine compasses, and the primary object of the same is to equip a device of this character with means for fixing the needle or pointer in any position desired to indicate a steering course for the purpose of informing relief helmsmen as to a continuous course to be followed without requiring an officer to explain to one helmsman taking the place of another the course to be followed and whereby the movement of a vessel in one direction over a long course occupying considerable time may be effected with certainty in accordance with desired navigation. A further object of the invention is to provide a marine compass of the liquid balancing and buoyant type embodying magnifying characteristics relatively to the image of the compass card with means for maintaining the shell or casing completely filled with a liquid to its entire capacity and overcome the formation of a bubble with obvious advantages in this type of compass. A further object of the invention is to provide a compass of the type specified having a comparatively simple and effective construction and arrangement of parts which may be readily controlled as to adjustment and operation with accuracy in the performance of the several functions for which the compass has been devised.

With these and other objects and advantages in view, the invention consists in the preferred construction and arrangement of parts which will be more fully hereinafter described and claimed.

Figure 1:
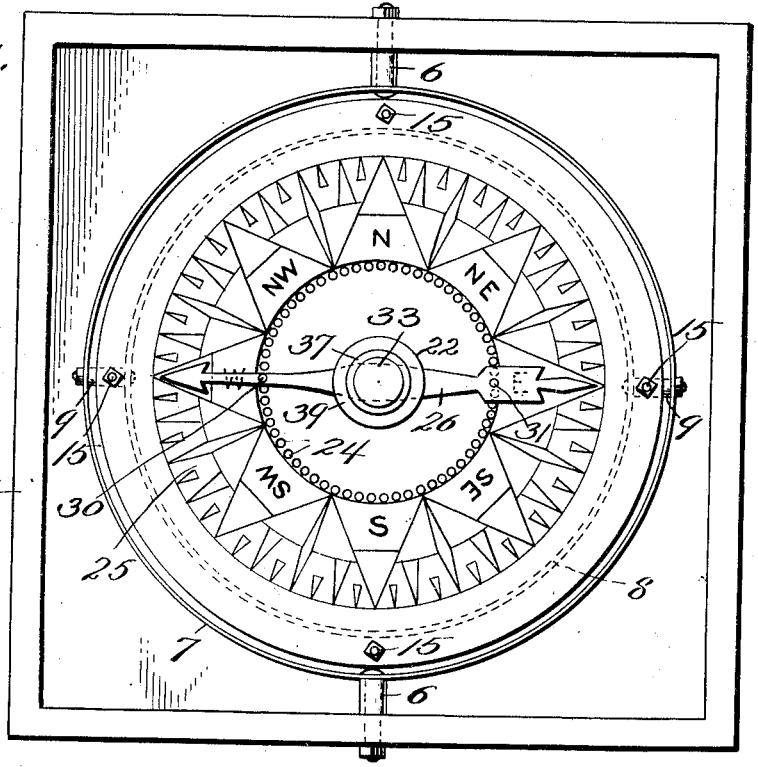
Figure 1 is a top plan view of a compass embodying the features of the invention.
Figure 2:
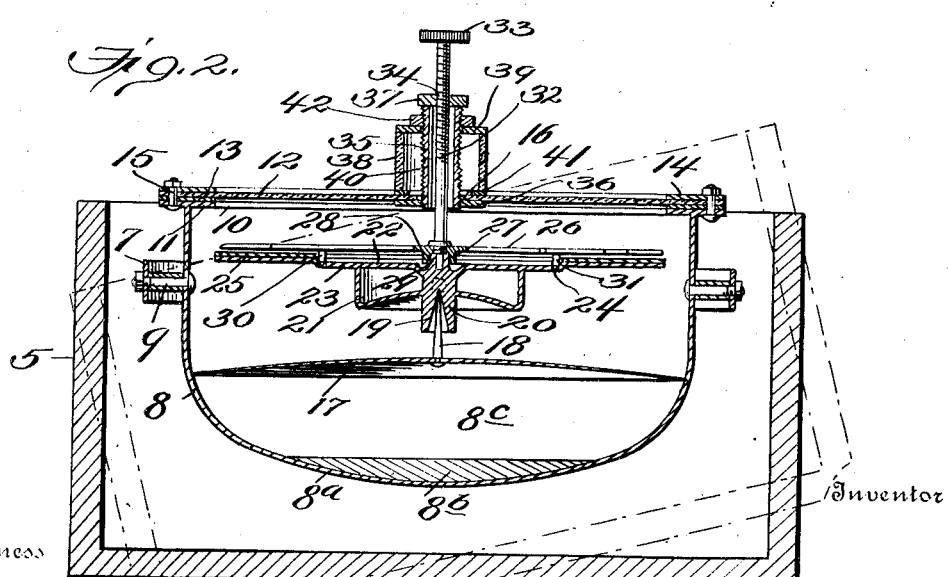
Fig. 2 is a transverse vertical section taken through the center of the improved compass.
Figure 3:
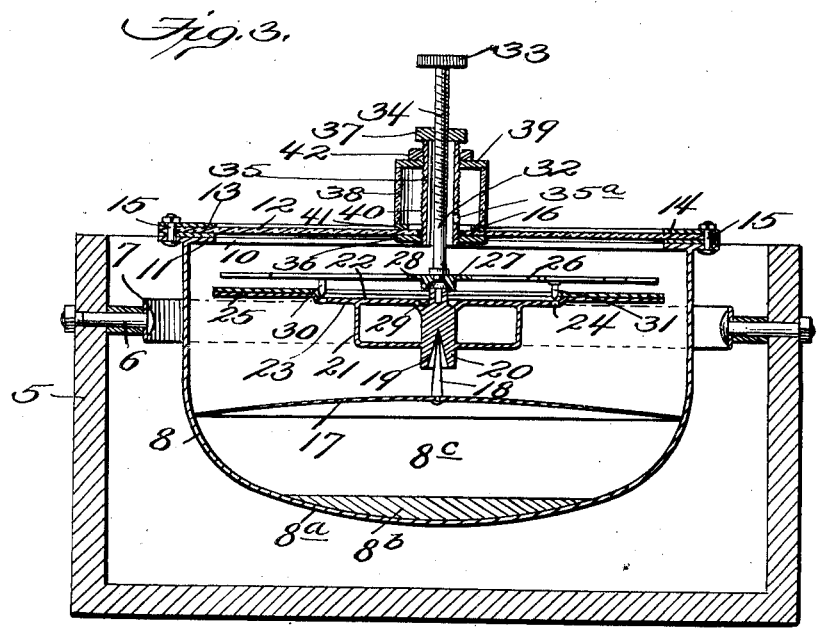
Fig. 3 is a view similar to Fig. 2 taken in a plane at right angles to that shown by Fig. 2.

The numeral 5 designates an ordinary form of case or box having oppositely disposed trunnions 6 connected to a ring or yoke 7 within which is a suitable casing, reservoir or bowl 8, the latter also having trunnions 9 connected to the said ring, the trunnions 9 being disposed in planes at right angles to the trunnions 6. The trunnions 6 and 9 have the usual functions of permitting the casing, reservoir or bowl 8 to automatically shift or move into a horizontal position or to be retained in the latter position when the vessel or sailing craft is careened or canted or subjected to other vibrating movement and whereby the compass may at all times be accurately read from the top portion thereof. The casing, reservoir or bowl 8 is fully closed, except at the top where an opening 10 is provided, the bottom $8^a$ of the bowl being rounded and having a counterpoise weight $8^b$ therein to maintain the same in true normal position. The top of the casing, reservoir or bowl has a rim 11 extending both inwardly and outwardly with relation thereto for the support of a top glass closure 12 between which and the rim 11 a suitable gasket or annular washer 13 is interposed to form a tight joint, a securing annulus 14 being disposed over the glass, and the latter together with the annulus, gasket and outer portion of the rim being secured by a suitable fastening means, as at 15, to produce an air and liquid-tight joint. The glass 12, as shown by Figs. 1, 2 and 3, is formed with a central opening 16 for a purpose which will be more fully hereinafter explained. Extending across the lower portion of the interior of the casing, reservoir or bowl 8 is a support 17 from the center of which a pin 18 projects upwardly a suitable distance and projects into a conical socket 19 vertically disposed in an arbor or hub 20 on which is secured a closed air chamber 21 adapted to contain the magnets as usual, the magnets being omitted in the present instance for the reason that they will be readily understood. Between the support 17 and the counterpoise weight $8^b$ an air space $8^c$ is formed. The air chamber 21 is fully closed and the top 22 has a flange 23 projecting outwardly therefrom and formed with a plurality of openings 24 at its outer edge. The card 25 is mounted on the top 22 and flange 23 of this air chamber and will be of the usual type having the cardinal designations and intermediate divisions. The conical socket 19 opens fully through the bottom of the arbor or hub 20 as will be understood and as clearly shown by Figs. 2 and 3 so that the upper pointed end of the pin 18 will engage the upper reduced terminal or apex of the said socket. A needle or pointer 26 is mounted to cooperate with the card, said needle or pointer being in the present instance materially modified in its actuation or having means in connection therewith radically differing from the ordinary form of compass needle. At the center of the needle or pointer 26 and at the bottom of the same is a boss 27 having a frusto-conical socket 28, and the upper end of the arbor or hub 20 is reduced, as at 29, to receive or permit the boss 27 with the socket 28 to be fitted thereover. At equal distances from the center of the needle or pointer 26 and depending therefrom are pins 30 and 31 which are adapted to be fitted in diametrically opposed pairs of the openings 24 at any point around the inner periphery of the card 25. Rising from the center of the needle or pointer 26 is a spindle or rod 32, the latter extending above the top of the compass any suitable distance and having its lower end secured in the center of the needle or pointer. The upper end of the spindle or rod 32 is provided with a milled head 33 for operating the same and at an intermediate point screw-threads 34 are formed on the said spindle or rod. The spindle or rod 32 extends through the center of a vertical sleeve 35 which is of materially greater inner diameter than the said spindle or rod and it extends through the opening 16 in the center of the glass top or cover 12 of the compass. Secured on the lower end of the sleeve 35 is a washer 36 and engaging the screw-threads 34 of the spindle or rod 32 is a holding or suspending nut 37 which is adapted to loosely bear on the upper end of the sleeve 35 to hold the spindle or rod and the needle or pointer in adjusted position. The sleeve 35 is surrounded by an air-tight inclosure consisting of a glass tube 38 of greater diameter than the said sleeve and provided with a top closure 39 engaging the exterior surface of the sleeve 35 which is screw-threaded, as at 40. Between the lower edge of the glass tube 38 and the glass top or cover 12 of the compass a rubber or other gasket 41 is introduced to form a tight, non-leakable joint, and on the sleeve 35 a ring nut 42 is mounted to clamp against the top plate 39 of the tube 38. The set nut 37 forms a closure for the upper end of the sleeve 35 as well as means for depending adjustment of the spindle or rod 32 and the needle or pointer 26. This nut, however, does not interfere or obstruct the upward movement of the spindle or rod 32 and is raised with the parts below to which it is connected when said parts are buoyantly elevated. The sleeve 35 has an opening 35ª therethrough near the lower end as shown by Fig. 3 and which provides a communication between the interior of the inclosure or tube 38 and the sleeve. The inclosure or tube is filled with liquid in excess of the liquid in the casing, reservoir or bowl 8, the said bowl 8 being filled above the support 17 and fully to the glass closure 12, and the surplus liquid in the inclosure or tube 38 will automatically compensate for evaporation or shrinkage of the liquid in the reservoir or bowl 8 and prevent the formation of a bubble in said reservoir or bowl.

Figure 4:
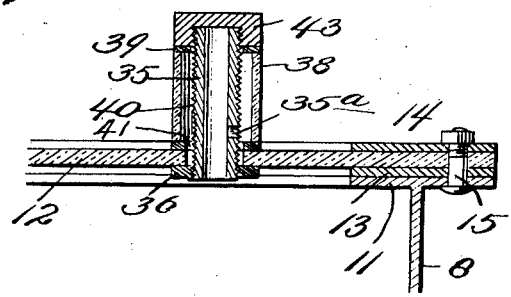
Fig. 4 is a transverse vertical section of a portion of the compass showing a modified structure.

In the modified construction shown by Fig. 4, the sleeve 35 with the opening 35ª, tube 38, gasket 41, and flange 36 are illustrated and perform the same function as the similar structure shown by Figs. 2 and 3, but in place of the set nut 37 a threaded screw-cap 43 is provided to close the upper end of the sleeve 35. The two structures as shown by Figs. 2 and 3 and Fig. 4 and embodying the sleeve 35 and tube 38 have the same purpose or provide filling means of an air-tight and non-leakable character for the reservoir or bowl 8, and it is intended to be understood that, by the illustration in Fig. 4, this filling means may be applied to any compass irrespective of the needle or pointer adjustment hereinbefore explained, and, moreover, the needle and pointer adjustment may be used independently of the filling attachment though it is preferable that it be combined therewith as illustrated in Figs. 2 and 3.

After the reservoir or bowl 8 has been filled with liquid in the form of the compass particularly shown by Figs. 1, 2 and 3, the air chamber 21 carrying the card will act as a float to take off or relieve the bearing stress of the arbor or hub 20 relatively to the pin 18, and the needle or pointer 26 may be adjusted to clear the openings 24 in the flange 23 of the top 22 of the air chamber 21, as shown by Fig. 3, and operate as an ordinary compass and in which adjustment the socket 28 will be disengaged from the upper reduced end 29 of the arbor or hub 20, the nut 37 under such conditions being loosened and permitting a free rotation of the spindle or rod 32 and the pointer or needle. When it is desired to set the needle or pointer 26, the nut 37 is loosened sufficiently to permit the spindle or rod 32 to be pushed downwardly with the needle or pointer 26 to cause the pins 30 and 31 to engage any two diametrically opposed openings 24 that may be desired in accordance with the direction or course to be continuously steered. When the improved compass is used as an ordinary compass, the needle or pointer is raised against the glass 12 by drawing upwardly on the spindle or rod 32 and the set nut 37 is then run down on the said spindle or rod 32 and tightened against the upper end of the sleeve 35 to close said sleeve and form an air-tight closure. The boss 27 coacting with the socket 28 and the hub maintains the spindle or rod 32 in central position within the sleeve 35 and prevents said spindle or rod from touching the sleeve when the compass is adjusted to bring the pins 30 and 31 in engagement with the diametrically opposed openings 24, or when the compass is adjusted to permit the spindle or rod 32 to have free movement in the sleeve.

The improved compass will be found exceptionally advantageous for the purposes for which it has been devised and will prove to eliminate considerable work on the part of the officers of a vessel when changing helmsmen by avoiding the necessity of repeated explanations or instructions in regard to the course in which the vessel shall be steered.

I claim as my invention:

1. In a marine compass, the combination with a card, of a needle or pointer, and means at a distance inwardly from the opposite terminals of the needle or pointer for engaging the card and holding the said needle or pointer at any point desired relatively to the card.

2. In a marine compass, the combination with a card, an apertured means supporting the card, a needle or pointer having depending pins to engage the apertured means, and means for holding the pointer or needle down relatively to the card.

3. In a marine compass, the combination with a card, of a pointer or needle having means depending from the lower side thereof for engaging the card to hold the pointer or needle in position relatively to various points on the card.

4. In a marine compass, the combination with a card, of a pointer or needle, and means for adjusting and fixing the pointer or needle relatively to any point on the card.

5. In a marine compass, the combination with a reservoir having a transparent top closure, an air chamber mounted for free rotation and movement within the reservoir and supporting a card, a needle or pointer to coöperate with the card, and a filling means consisting of a sleeve extending through the transparent top closure and having its lower end secured against the under side of said closure and having an air-tight tubular closure around the sleeve provided with a top cover, a gasket introduced between the lower end of the tubular closure and the transparent closure, and means for closing the upper end of the sleeve and setting up a binding on the top cover of the air-tight closure.

6. In a marine compass, the combination with a reservoir having an air chamber therein carrying a card, a needle or pointer, and a filling means for the reservoir consisting of a tubular device projecting through the top closure of the reservoir and surrounded by an air-tight closure with which said tubular device has communication, and means for closing the upper end of the tubular device and bearing on the top portion of the said air-tight closure.

7. In a marine compass, the combination of a reservoir having a transparent top closure, an air chamber therein having a top supporting a card, a needle or pointer provided with depending pins to engage a portion of the top of the air chamber, a central sleeve projecting through the transparent top closure of the reservoir and secured against the under side of the latter, an air-tight inclosure around and having communication with the said sleeve and coöperating with the top surface of the transparent closure of the reservoir, a spindle secured to the needle or pointer and loosely extending upwardly through the sleeve, and means for engaging the spindle and bearing on the top of the sleeve to maintain the adjustment of the needle or pointer relatively to the card.

In testimony whereof I have hereunto set my hand in presence of two subscribing witnesses.

ALVA B. BUNKER.

Witnesses:
 F. F. SARGENT,
 FRED P. SARGENT.